United States Patent Office 3,208,990
Patented Sept. 28, 1965

3,208,990
METAL-CONTAINING REACTIVE AZO
CHLOROPYRIMIDINE DYESTUFFS
Jakob Benz, Oberwil, Basel-Land, and August Schweizer, Muttenz, Basel-Land, Switzerland, assignors to Sandoz Ltd., Basel, Switzerland
No Drawing. Filed July 30, 1962, Ser. No. 213,122
Claims priority, application Switzerland, May 6, 1959, 72,974
7 Claims. (Cl. 260—146)

This application is a continuation-in-part of application Serial No. 26,397, filed on May 3, 1960, (now abandoned) and relates to copper- or nickel-containing reactive dyestuffs which correspond in the metal-free form to the formula

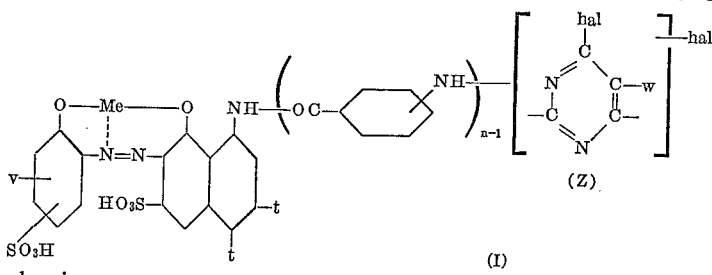

wherein:

One $t$ is hydrogen and the other $t$ is $-SO_3H$,
$v$ is a member selected from the group consisting of hydrogen, chlorine, bromine, lower alkyl, lower alkoxy, nitro, carboxy and sulfo,
$w$ is a member selected from the group consisting of hydrogen, chlorine, bromine, lower alkyl, lower carbalkoxy, carboxy and carboxymethyl,
hal is a member selected from the group consisting of chlorine and bromine,
Me is a member selected from the group consisting consisting of copper and nickel, and
$n$ is a positive whole number of at most 2.

The new metal-containing reactive dyestuffs may be prepared by reacting together:

(A) 1 mole of the diazo compound of a 2-amino-1-hydroxybenzene-mono- or -di-sulfonic acid which may, but need not, contain further substitutents;
(B) 1 mole of a coupling component of the formula

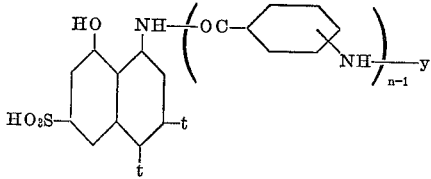

wherein:

$t$ and $n$ possess the aforecited meanings and $y$ stands for an exchangeable hydrogen atom; and (C) 1 mole of (a) a tetrahalopyrimidine, e.g., 2,4,5,6-tetrabromopyrimidine, (b) a trihalopyrimidine, e.g., 2,4,6-dibromopyrimidine, (c) a substituted trihalopyrimidine e.g., 2,5,6-tribromo-4-methylpyrimidine, or (d) a dihalopyrimidine, substituted by a halomethyl group, e.g., 2,4-dibromo-5-bromomethyl-6-methylpyrimidine; the reaction being conducted so that the diazo compound is introduced into the position ortho to the —OH of the coupling component, and the hydrogen atom $y$ of the coupling component is replaced by the radical Z, as defined above. The dyestuffs are treated either during or after their formation with a copper- or nickel-yielding agent, e.g., cupric chloride, cupric acetate, nickel sulfate, nickel formate.

A suitable procedure is as follows: One mole of (A) a monoazo dyestuff of the formula:

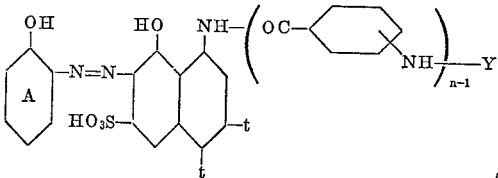

wherein A, $n$, $t$ and $y$ possess the aforecited meanings; one mole of (B) (I) a tetrahalopyrimidine, (II) a further substituted or further unsubstituted trihalopyrimidine, or (III) a dihalopyrimidine further substituted by a halomethyl group and (C) a copper- or nickel-yielding agent $$Z = \begin{bmatrix} \text{hal} \\ | \\ C \\ N \nearrow \diagdown C-w \\ | \quad \quad \| \\ -C \diagdown \diagup C- \\ N \end{bmatrix}-\text{hal}$$

are reacted together so that the exchangeable hydrogen atom $y$ of the monoazo dyestuff (III) is replaced by the radical Z and the copper- or nickel-yielding agent reacts with the ortho-ortho'-dihydroxyazo grouping.

A modification of this procedure consists of coupling in ortho-position to the hydroxy group 1 mole of the diazo compound of the amine of the formula

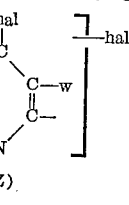

wherein A possesses the aforecited meaning, with 1 mole of coupling component of the formula

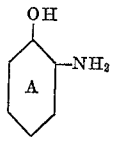

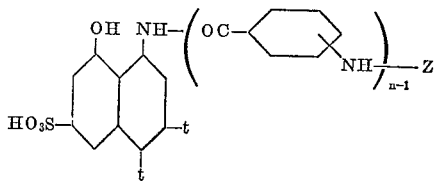

wherein $n$, $t$ and Z possess the aforecited meanings, and treating the resulting monoazo dyestuff with a copper- or nickel-yielding agent.

The metal-containing reactive dyestuffs obtained by both the above procedures are the copper- and nickel-complex compounds of Formula I. The radical A contains one or two sulfonic acid groups. Other substituents which may, but need not, be carried by the nucleus A are halo, e.g., chloro, bromo; lower alkyl, e.g., methyl, ethyl; alkoxy (preferably lower alkoxy), e.g. methoxy, ethoxy; carboxy and nitro. Especially suitable diazo components of the Formula IV are e.g. 1-amino-2-hydroxy - 5 - chlorobenzene - 3 - sulfonic acid, 1-amino-2-hydroxy - 3 - carboxybenzene - 5 - sulfonic acid, 1-amino-2 - hydroxybenzene - 3,5 - disulfonic acid, 1 - amino - 2-hydroxybenzene - 5 - sulfonic acid.

Coupling components which are suitable as starting materials are 1-amino-8-hydroxynaphthalene-3,6-disulfonic acid, 1-amino-8-hydroxynaphthalene-4,6-disulfonic acid and derivatives of these acids in which the amino group is acylated by an aminobenzoyl radical.

The coupling reaction leading to dyestuffs of Formula III is carried out in aqueous medium advantageously at low temperature, e.g., at from 0° to 20° C., in the presence of an acid-binding agent, such as sodium carbonate or sodium bicarbonate, at an alkaline pH and, if desired, with the addition of tertiary amines, which accelerate the coupling reaction, e.g. pyridine or a mixture of pyridine bases.

The reactive substituent Z is preferably the radical of a polyhalopyrimidine containing at least two mobile halogen atoms, e.g.: the radical of 2,4,6-trichloropyrimidine or 2,4,6-tribromopyrimidine 2,4,6-trichloro-5-methyl- or -5-ethyl-pyrimidine
2,4,6-tribromo-5-methylpyrimidine
2,4,6-trichloro-5-carbomethoxy- or -5-carboethoxy-pyrimidine
2,4,6-trichloro- or 2,4,6-tribromo-5-carboxypyrimidine
2,4,6-trichloro- or 2,4,6-tribromopyrimidyl-5-acetic acid
2,4,6-trichloro-5-chloromethylpyrimidine
2,4,6-tribromo-5-bromomethylpyrimidine
2,4,5,6-tetrachloropyrimidine, 2,4,5,6-tetrabromo-pyrimidine
2,4,5-trichloropyrimidine or 2,4,5-tribromopyrimidine
2,5,6-trichloro-4-methylpyrimidine
2,5,6-tribromo-4-methylpyrimidine
2,4-dichloro-5-chloromethylpyrimidine
2,4-dibromo-5-bromomethylpyrimidine
2,4-dichloro-5-chloromethyl-6-methylpyrimidine
2,4-dibromo-5-bromomethyl-6-methylpyrimidine.

Each and every one of the particularized reactive substituents Z, Y and X are contemplated within the full scope of variations encompassed by Formulae I and VI, respectively. For the nucleus A of Formula I, the corresponding moiety of Formula VI is contemplated.

The reaction of the coupling components or of the monoazo dyestuffs of Formula III, which latter are employed preferably in the form of their copper or nickel complex compounds, with the tri- or tetrahalopyrimidines is also carried out in aqueous medium. The halide can be applied as such in concentrated form or in solution in an organic solvent, particularly suitable solvents being acetone, benzene, chlorobenzene and toluene. The reaction temperature is adjusted to suit the reactivity of the individual starting products and varies from 20° to 100° C. If temperatures higher than about 40° C. are necessary, it is advisable to work in vessels equipped with reflux condensers in view of the volatility in steam of some halopyrimidines.

The reaction is conducted in weakly alkaline, neutral to weakly acid medium, preferably within the pH-range of 9 to 3. To neutralize the hydrogen halide formed, an acid-binding agent, e.g. sodium acetate or sodium metaphosphate, is added to the solution at the beginning of the reaction, or, alternatively, sodium or potassum carbonate or bicarbonate in solid powdered form or in aqueous solution is added in small portions during the course of the reaction. Other suitable neutralizing agents are aqueous solutions of sodium or potassium hydroxide. The addition of small amounts of a wetting or emulsifying agent to the reaction mixture can increase the rate of reaction. The reaction is conducted with molecular proportions of reactants or with a slight excess of the reactive component in such a way that only one halogen atom reacts with an exchangeable hydrogen atom.

The coupling of the diazo compound of an amine of the Formula IV with a coupling component of Formula V is carried out in neutral or alkaline medium, preferably at temperaures of 0° to 20° C. and, if desired, in the presence of pyridine.

The monoazo dyestuffs are converted into their copper or nickel complex compounds preferably in weakly acid aqueous solution. The reactants are proportioned so that an amount of metal-yielding agent containing one atom of metal reacts with one molecule of monoazo dyestuff.

Among suitable inorganic and organic copper-yielding agents are cupric salts of strong mineral acids, e.g. cupric sulfate and cupric chloride, and cupric salts of lower alkanoic acids, e.g. cupric formate and cupric acetate. Suitable inorganic and organic nickel-yielding agents include nickel salts of strong mineral acids, e.g. nickel sulfate, and nickel salts of lower alkanoic acids, e.g. nickel formate and nickel acetate.

The metal complex compounds obtained are precipitated from their aqueous solutions with salt and then filtered off, washed, if necessary, and dried.

The metal-containing azo dyestuffs obtained are homogeneous metal complex compounds in which essentially one atom of metal is linked to one molecule of monoazo compound.

The new copper- or nickel-containing reactive dyestuffs are only slightly sensitive to salt and hard water. They show very good solubility in water and very little substantivity so that on fixation the unfixed portion of dyestuff can be easily removed by washing. They are insensitive to heavy metal ions, such as copper, iron and chromium ions; they possess good stability in printing pastes and padding solutions and good reactivity with vegetable fibers, animal and synthetic polyamide fibers. They are, therefore, particularly well suited for the dyeing, padding or printing of wool, silk, leather, synthetic polyamide fibers and fibers of natural or regenerated cellulose, on which they give red-violet to blue-violet shades. If necessary, the pad-dyeings or prints on cellulosic fibers are subjected to an alkaline aftertreatment for a short time, preferably between 1 and 15 minutes, at high temperature followed by soaping. The dyestuffs are also suitable for the Pad-Batch process, in which the cellulosic fibers are impregnated with an alkaline dyestuff solution, wrapped in a sheet of plastic and stored at room temperature for a long time, preferably between 10 and 50 hours, then rinsed, soaped, rinsed again and dried. The dyeings and prints possess high fastness to light, heat, water, sea-water, washing, milling, potting, perspiration, rubbing, alkali, soda boiling, chlorine water, bleaching (peroxides), wet ironing, vulcanizing, gas fumes, weak oxidation and reduction agents, acid and alkaline hydrolytic influences, crease-resistant finishing and dry cleaning.

The new metal-containing reactive dyestuffs reserve polyethylene-terephthalate fibers, acetate and triacetate fibers, polyacrylonitrile fibers, polyalkylene fibers, polyvinyl chloride and polyvinyl acetate fibers.

The most interesting dyes are those of the formula

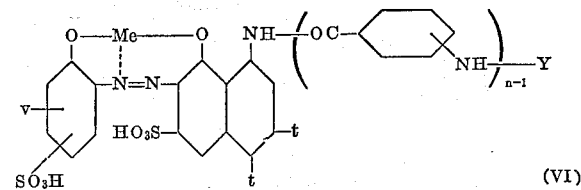

(VI)

wherein:

n and the two t's have the aforesaid meanings;

v is hydrogen; halogen, e.g. chlorine, bromine; lower alkyl, e.g. methyl; lower alkoxy, e.g. methoxy; nitro; carboxy; or —SO₃H;

Y is 2,6-dichloropyrimidyl-4; 4,6-dichloropyrimidyl-2; 2,6-dibromopyrimidyl-4; 4,6-dibromopyrimidyl-2; 2,5,6-trichloropyrimidyl-4; 2,5,6-tribromopyrimidyl-4; or 2,4-dichloro-6-methyl-pyrimidyl-5-methylene; and Me is either copper or nickel.

Exemplary dyes of Formula VI are represented, e.g., by Formulae VII to XXI; Formulae VII to XIV representing such dyes wherein n is 1, and Formulae XV to XXI representing such dyes wherein n is 2.

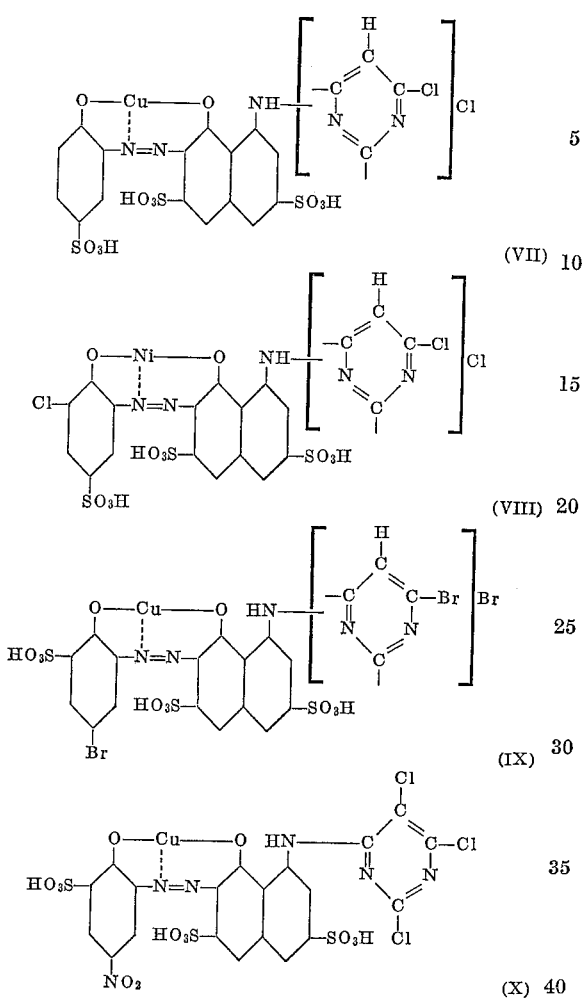
(VII)
(VIII)
(IX)
(X)
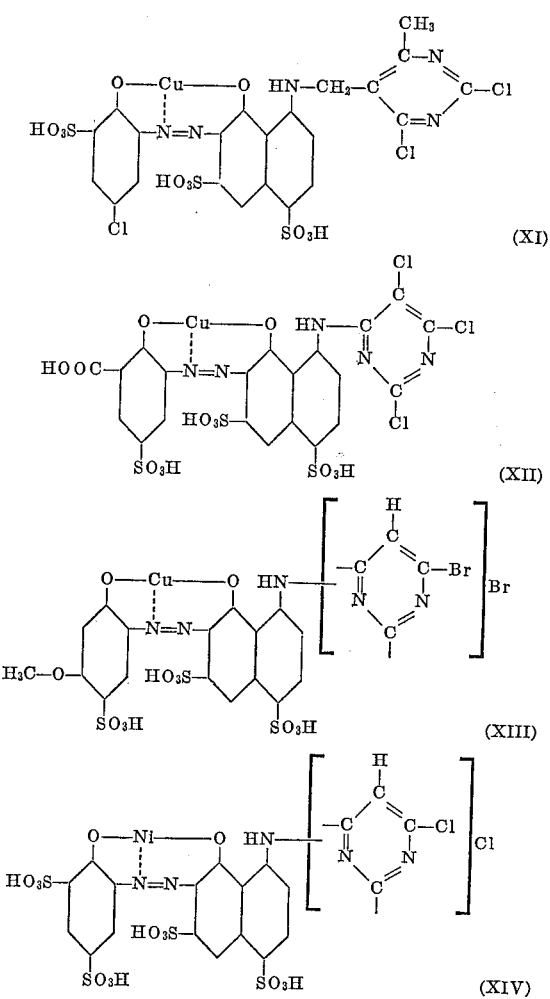
(XI)
(XII)
(XIII)
(XIV)
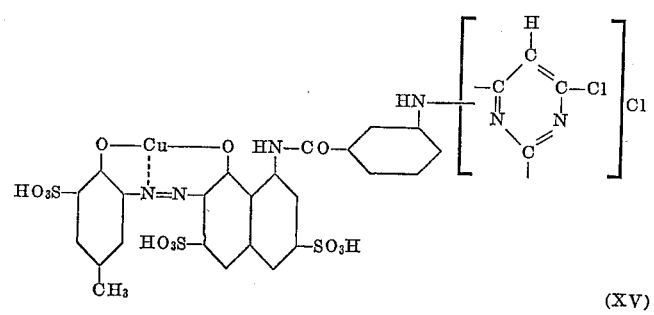
(XV)
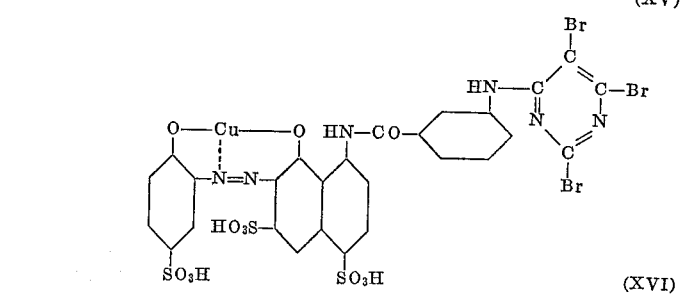
(XVI)
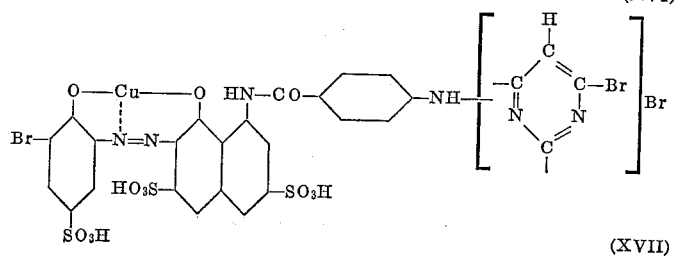
(XVII)

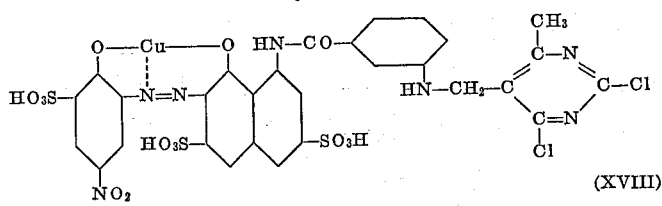

(XVIII)

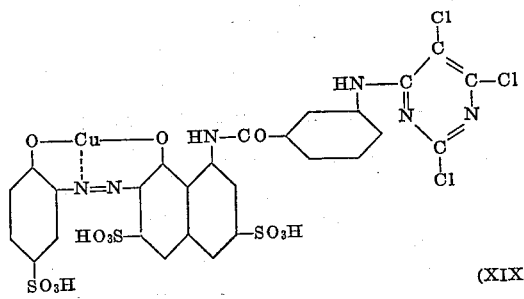

(XIX)

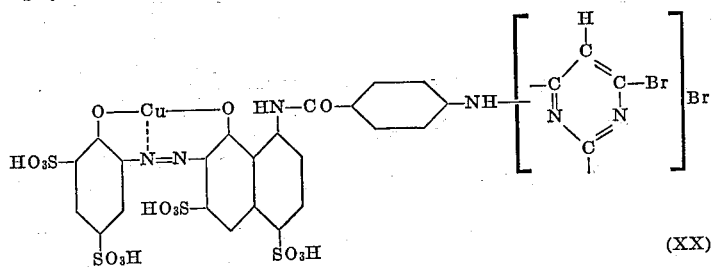

(XX)

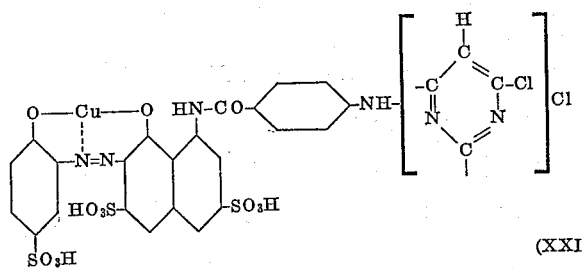

(XXI)

In the following examples the parts and percentages are by weight, and the temperatures are in degrees centigrade.

*Example 1*

32 parts of 1-amino-8-hydroxynaphthalene-3,6-disulfonic acid are dissolved in 200 parts of water by the addition of sodium hydroxide solution to give a weakly acid reaction. 19 parts of 2,4,6-trichloropyrimidine are added and the reaction mixture heated at 60° for 5 to 6 hours with vigorous stirring and gradual dropwise addition of a 15% aqueous sodium carbonate solution to maintain the pH-value at from 4.0 to 4.5. On completion of the reaction the mixture is cooled to 5° and diluted with 200 parts of water. 30 parts of sodium carbonate are added, and the conventionally prepared solution of the diazo compound of 22 parts of 1-amino-2-hydroxy-3-chlorobenzene-5-sulfonic acid is run in at from 5° to 10° with thorough stirring. On completion of coupling the blue-violet dyestuff solution is neutralized by the addition of 15% hydrochloric acid to give a weakly acid reaction to litmus. The solution is then heated to 60° and the dyestuff salted out by the addition of sodium chloride. The dyestuff is filtered off and washed with sodium chloride solution.

The moist filter cake is stirred into 1000 parts of water at 70°. 30 parts of crystallized sodium acetate are added, then sufficient 16% copper sulfate solution is run in until copper ions are indicated in the filtrate of a salted-out sample. The resulting copper complex dyestuff is precipitated from its solution by the addition of sodium chloride, filtered with suction, washed with sodium chloride solution and dried with vacuum at 80°. On grinding, a dark powder is obtained which dissolves in water with a violet coloration. The dyestuff is only slightly sensitive to salt and has good stability in printing pastes. Owing to its good solubility, the unfixed portion of the dyestuff can be easily washed off the fiber after fixation.

3 parts of the dyestuff obtained according to the above procedure are dissolved in 100 parts of warm water with the addition of 30 parts of a 10% sodium carbonate solution and 0.5 part of sodium 1-nitrobenzene-3-sulfonate. A fabric of viscose staple fiber is impregnated with this solution at an expression (pick-up) giving an increase of 75% on the dry weight. The fabric is dried, steamed with wet steam for from 5 to 10 minutes at 102°, rinsed in warm and cold water, soaped at the boil if necessary, and again rinsed with hot and with cold water and dried. A violet dyeing of very good light and wash fastness is obtained.

*Example 2*

18.9 parts of 1-amino-2-hydroxybenzene-5-sulfonic acid are stirred into 100 parts of cold water, acidified with 10 parts of 30% hydrochloric acid and diazotized at 10° by the gradual even addition of a solution of 7 parts of sodium nitrite in 25 parts of water. 32 parts of 1-amino-8-hydroxy-naphthalene-3,6-disulfonic acid are dissolved neutral with about 13 parts of 30% sodium hydroxide solution in 200 parts of water. 25 parts of sodium bicarbonate are added; and, after cooling to 5°, the solution of the diazo compound is run in at an even rate. On completion of coupling the blue-violet monoazo dyestuff formed is partially precipitated. It is completely precipitated by the addition of sodium chloride solution, then filtered off and washed with sodium chloride solution.

In a mixing vessel fitted with a reflux condenser the moist filter cake is stirred into 700 parts of water at 60°.

30 parts of crystallized sodium acetate are added, and, simultaneously, about 95 parts of a 16% copper sulfate solution are run in until copper ions are indicated in the filtrate of a salted-out sample. On completion of metallization of the dyestuff the solution is carefully adjusted to pH 6 with sodium hydroxide solution. 22 parts of 2,4,5,6-tetrachloropyrimidine are added, and the mixture is stirred for from 3 to 5 hours at from 60° to 70°. By even addition of a dilute sodium hydroxide solution, the pH-value of the reaction mixture is maintained between 5 and 6. When the reaction is completed, which can be easily followed by chromatography, the copper-containing pyrimidine dyestuff is salted out of its solution, filtered off and washed with sodium chloride solution.

The moist dyestuff is dried at 80° under reduced pressure. In the ground form it is a dark powder which dissolves in water to give violet solutions. It possesses only slight salt sensitivity and shows good stability in printing pastes. Owing to its good solubility in water the unreacted portion of the dyestuff can be easily washed off the goods after fixation.

A mercerized cotton fabric is printed with a paste of the following composition:

15 parts of the dyestuff obtained according to the procedure of Example 2,
100 parts of urea,
400 parts of water,
450 parts of 4% sodium alginate thickening,
10 parts of sodium 1-nitrobenzene-3-sulfonate and
25 parts of sodium carbonate 1000 parts.

The print is dried and fixed by steaming for 5 minutes, then rinsed in cold and warm water, soaped at the boil, rinsed again in warm and cold water and dried. A violet print is obtained which is very fast to light and washing.

A mercerized cotton fabric is impregnated at 25° with a padding liquor containing 30 grams per liter of the above described dyestuff, 150 grams per liter of calcined sodium sulfate, 30 grams per liter of sodium metasilicate and 15 ml. per liter of a 30% sodium hydroxide solution. The fabric is then squeezed out so that the pick-up of liquor is about 75% of the weight of the dry material, wrapped in a sheet of plastic and stored for 24 hours at 25°. Then it is rinsed with cold and with warm water, soaped for 20 minutes at the boil with a solution containing 0.35 gram of a partially carboxymethylated alkylpolyglycol ether and 0.5 gram of sodium carbonate per liter, rinsed again and dried. A violet dyeing of very good fastness to light, washing, water, sea-water, perspiration, rubbing and drying cleaning is obtained.

*Example 3*

18.9 parts of 1-amino-2-hydroxybenzene-5-sulfonic acid are diazotized by the procedure described in Example 2. 44 parts of 1-(3'-amino)-benzoylamino-8-hydroxynaphthalene-3,6-disulfonic acid are dissolved neutral with about 13 parts of 30% sodium hydroxide solution in 500 parts of water. 24 parts of sodium bicarbonate and 50 parts of pyridine are added, the solution cooled to 10° and the solution of the diazo compound is run in at an even rate. On completion of coupling the blue-violet monoazo dyestuff formed is precipitated with 30% hydrochloric acid, filtered off and purified by dissolving and reprecipitation.

32 parts of the monoazo dyestuff obtained are dissolved neutral in 650 parts of water at 60° and stirred in a vessel with 11 parts of 2,4,5,6-tetrachloropyrimidine for from 3 to 5 hours at from 60° to 70°. By even addition of a 15% aqueous sodium carbonate solution, the pH-value of the mixture is maintained between 3.5 and 5.5.

On completion of the reaction 15 parts of crystallized sodium acetate are added; and, subsequently, a sufficient amount of 10% copper sulfate solution is run in until copper ions are indicated in the filtrate of a salted-out sample. The copper complex dyestuff obtained is precipitated from its solution by the addition of sodium chloride, filtered with suction and dried with vacuum at 80°. On grinding it is a dark powder which dissolves in water with a violet coloration.

When the dyestuff is printed using the recipe given in Example 2, a reddish violet print is obtained which is fast to light and washing and withstands crease-resistant finishing.

The following table gives details of further metal-containing reactive dyestuffs which, like dyestuffs represented by Formulae VIII to XXXI, are obtainable according to the procedure described in Examples 1 to 3. In the table the further metal-containing reactive dyestuffs are characterized in columns I to V, respectively, by the diazo and coupling component, the reactive compound, the metal used for metal-complex formation and the shade of the dyeing on cotton.

| Example No. | Diazo Component (I) | Coupling Component (II) | Reactive Compound (III) | Metal (IV) | Shade of the Dyeing on Cotton (V) |
|---|---|---|---|---|---|
| 4 | 1-amino-2-hydroxy-5-chlorobenzene-3-sulfonic acid. | 1-amino-8-hydroxy-naphthalene-3,6-disulfonic acid. | 2,4,6-trichloro-pyrimidine. | Cu | Violet. |
| 5 | 1-amino-2-hydroxy-3-carboxy-benzene-5-sulfonic acid. | ----do---- | ----do---- | Cu | Do. |
| 6 | 1-amino-2-hydroxy-benzene-3,5-disulfonic acid. | 1-(3'-amino)-benzoylamino-8-hydroxy-naphthalene-3,6-disulfonic acid. | 2,4,5,6-tetrachloro-pyrimidine. | Cu | Reddish violet. |
| 7 | ----do---- | ----do---- | 2,4-dichloro-5-chloro-methyl-6-methylpyrimidine. | Cu | Do. |
| 8 | ----do---- | ----do---- | 2,4,6-trichloro-pyrimidine. | Cu | Do. |
| 9 | 1-amino-2-hydroxy-benzene-5-sulfonic acid. | 1-amino-8-hydroxy-naphthalene-3,6-disulfonic acid. | ----do---- | Ni | Do. |
| 10 | ----do---- | ----do---- | 2,4,5-trichloro-pyrimidine. | Cu | Violet. |
| 11 | ----do---- | 1-amino-8-hydroxy-naphthalene-4,6-disulfonic acid. | 2,4,5,6-tetrachloro-pyrimidine. | Cu | Do. |
| 12 | ----do---- | ----do---- | ----do---- | Ni | Reddish violet. |
| 13 | 1-amino-2-hydroxy-3-carboxy-benzene-5-sulfonic acid. | ----do---- | 2,4,6-trichloro-pyrimidine. | Cu | Violet. |
| 14 | 1-amino-2-hydroxy-benzene-3,5-disulfonic acid. | ----do---- | ----do---- | Cu | Do. |
| 15 | 1-amino-2-hydroxy-3-nitrobenzene-5-sulfonic acid. | 1-amino-8-hydroxy-naphthalene-3,6-disulfonic acid. | 2,4,5,6-tetrachloro-pyrimidine. | Cu | Bluish violet. |
| 16 | 1-amino-2-hydroxy-5-nitrobenzene-3-sulfonic acid. | ----do---- | ----do---- | Cu | Do. |
| 17 | 1-amino-2-hydroxy-5-methoxy-benzene-3-sulfonic acid. | ----do---- | 2,4,6-tribromopyrimidine. | Cu | Violet. |
| 18 | 1-amino-2-hydroxybenzene-5-sulfonic acid. | ----do---- | 2,4,6-trichloro-5-methyl-pyrimidine. | Cu | Do. |
| 19 | 1-amino-2-hydroxybenzene-5-sulfonic acid. | ----do---- | 2,4-dichloro-5-chloromethyl-pyrimidine. | Cu | Do. |
| 20 | ----do---- | 1-amino-8-hydroxynaphthalene-4,6-disulfonic acid. | ----do---- | Cu | Do. |

| Example No. | Diazo Component (I) | Coupling Component (II) | Reactive Compound (III) | Metal (IV) | Shade of the Dyeing on Cotton (V) |
|---|---|---|---|---|---|
| 21 | 1-amino-2-hydroxy-benzene-3,5-disulfonic acid. | 1-(4'-amino)-benzoyl-amino-8-hydroxy-naphthalene-3,6-disulfonic acid. | 2,4,5,6-tetrachloropyrimidine. | Cu | Reddish violet. |
| 22 | ....do.... | ....do.... | 2-4-dichloro-5-chloromethyl-6-methylpyrimidine. | Cu | Do. |
| 23 | 1-amino-2-hydroxy-benzene-5-sulfonic acid. | 1-amino-8-hydroxy-naphthalene-3,6-disulfonic acid. | 2,4,5,6-tetrabromo-pyrimidine. | Cu | Violet. |
| 24 | 1-amino-2-hydroxy-5-bromobenzene-3-sulfonic acid. | ....do.... | 2,4,5,6-tetrachloropyrimidine. | Cu | Do. |
| 25 | 1-amino-2-hydroxy-5-ethylbenzene-3-sulfonic acid. | 1-amino-8-hydroxynaphthalene-3,6-disulfonic acid. | 2,4,5,6-tetrachloropyrimidine. | Cu | Do. |
| 26 | 1-amino-2-hydroxy-5-ethoxy-benzene-3-sulfonic acid. | ....do.... | ....do.... | Cu | Do. |
| 27 | 1-amino-2-hydroxybenzene-5-sulfonic acid. | ....do.... | 2,4,6-trichloro-5-chloromethyl-pyrimidine. | Cu | Do. |
| 28 | ....do.... | ....do.... | 2,4,6-trichloro-5-carbomethoxy pyrimidine. | Cu | Do. |
| 29 | ....do.... | ....do.... | 2,4,6-tribromo-5-carboxy-methyl-pyrimidine. | Cu | Do. |
| 30 | ....do.... | ....do.... | 2,4,5,6-tetrachloropyrimidine. | Ni | Reddish violet. |
| 31 | ....do.... | ....do.... | 2-4-dichloro-5-chloromethyl-6-methyl-pyrimidine. | Cu | Violet. |
| 32 | ....do.... | ....do.... | 2,4,6-trichloro-5-carboxymethyl-pyrimidine. | Cu | Do. |
| 33 | ....do.... | 1-amino-8-hydroxynaphthalene-4,6-disulfonic acid. | 2,4,6-trichloro-5-ethyl-pyrimidine. | Cu | Do. |
| 34 | ....do.... | ....do.... | 2,4,5-tribromopyrimidine. | Cu | Do. |
| 35 | 1-amino-2-hydroxybenzene-3,5-disulfonic acid. | 1-amino-8-hydroxynaphthalene-3,6-disulfonic acid. | 2,4,6-trichloro-5-chloromethyl-pyrimidine. | Cu | Do. |
| 36 | 1-amino-2-hydroxybenzene-3,5-disulfonic acid. | 1-amino-8-hydroxynaphthalene-3,6-disulfonic acid. | 2,4,6-tribromo-5-bromomethyl-pyrimidine. | Cu | Do. |
| 37 | ....do.... | 1-(4'-amino-benxoyl-amino)-8-hydroxynaphthalene-4,6-disulfonic acid. | 2,4,5,6-tetrachloropyrimidine. | Cu | Reddish violet. |
| 38 | ....do.... | 1-amino-8-hydroxynaphthalene-3,6-disulfonic acid. | 2,4-dibromo-5-bromomethyl-6-methylpyrimidine. | Cu | Violet. |
| 39 | ....do.... | ....do.... | 2,4,6-tribromo-5-ethylpyrimidine. | Cu | Do. |
| 40 | ....do.... | ....do.... | 2,4,6-tribromo-5-carboethoxy-pyrimidine. | Cu | Do. |
| 41 | ....do.... | ....do.... | 2,5,6-tribromo-4-methylpyrimidine. | Cu | Do. |
| 42 | 1-(3'-amino)-benzoylamino-8-hydroxy-naphthalene-4,6-disulfonic acid. | | 2,4,6-trichloro-pyrimidine. | Cu | Reddish violet. |
| 43 | 1-amino-2-hydroxybenzene-3,5-disulfonic acid. | ....do.... | 2,4,5,6-tetrachloropyrimidine. | Cu | Do. |
| 44 | 1-amino-2-hydroxybenzene-5-sulfonic acid. | 1-amino-8-hydroxynaphthalene-4,6-disulfonic acid. | 2,4,6-trichloro-5-carboethoxy-pyrimidine. | Cu | Violet. |
| 45 | ....do.... | ....do.... | 2,4,6-tribromo-5-methylpyrimidine. | Cu | Do. |
| 46 | 1-amino-2-hydroxy-3-carboxy-benzene-5-sulfonic acid. | 1-amino-8-hydroxynaphthalene-3,6-disulfonic acid. | 2,4-dibromo-5-bromomethylpyrimidine. | Cu | Do. |
| 47 | ....do.... | ....do.... | 2,4,6-tribromo-5-carbomethoxy-pyrimidine. | Cu | Do. |
| 48 | 1-amino-2-hydroxybenzene-3,5-disulfonic acid. | 1-amino-8-hydroxynaphthalene-3,6-disulfonic acid. | 2,5,6-trichloro-4-methyl-pyrimidine. | Cu | Do. |
| 49 | 1-amino-2-hydroxy-3-methyl-benzene-5-sulfonic acid. | ....do.... | 2,4,6-trichloropyrimidine. | Cu | Do. |
| 50 | 1-amino-2-hydroxy-5-carboxybenzene-3-sulfonic acid. | ....do.... | 2,4,5,6-tetrachloro-pyrimidine. | Cu | Do. |

Formulae of representative dyestuffs of the foregoing examples are as follows:

*Example 1*

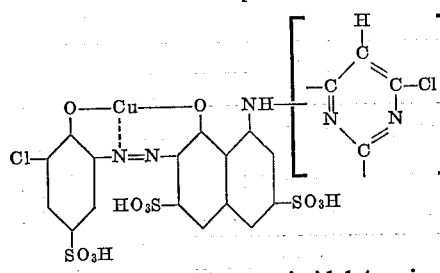

mixture of the 2,6-dichloro-pyrimidyl-4-amino dyestuff and of the 4,6-dichloropyrimidyl-2-amino dyestuff.

*Example 2*

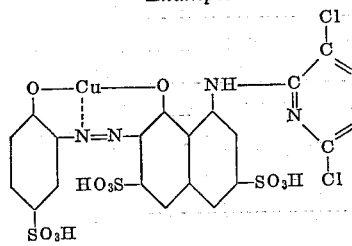

*Example 3*

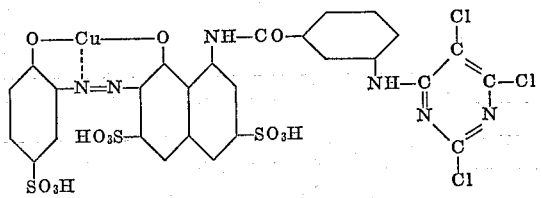

*Example 9*

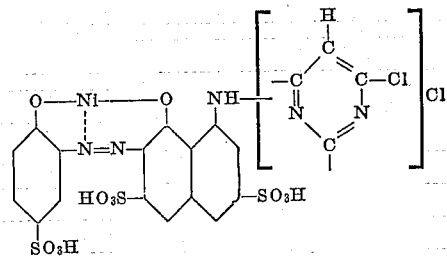

mixture of the 2,6-dichloro-pyrimidyl-4-amino dyestuff and of the 4,6-dichloropyrimidyl-2-amino dyestuff.

Example 11

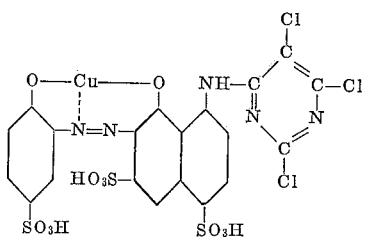

Example 12

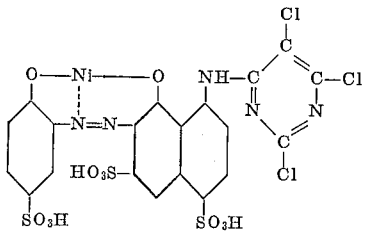

Example 30

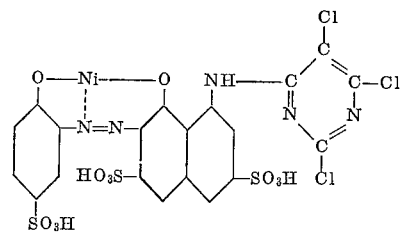

It is thought that the invention and its advantages will be understood from the foregoing description, and it is apparent that various changes may be made in the structure of the dyestuffs without departing from the spirit and scope of said invention or sacrificing its material advantages. The particular dyestuffs hereinbefore described are merely illustrative of preferred embodiments of the invention.

What is claimed is:

1. Dyestuff of the formula

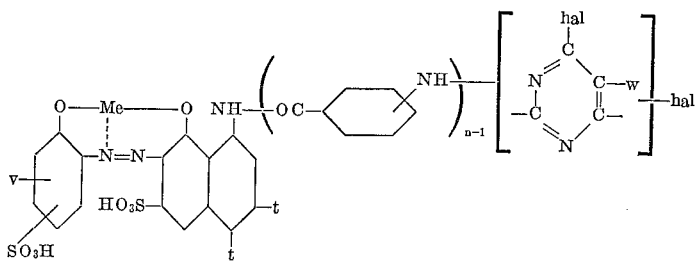

wherein:

one $t$ is hydrogen and the other $t$ is —$SO_3H$, $v$ is a member selected from the group consisting of hydrogen, chlorine, bromine, lower alkyl, lower alkoxy, nitro, carboxy and sulfo, $w$ is a member selected from the group consisting of hydrogen, chlorine, bromine, lower alkyl, lower carbalkoxy, carboxy and carboxymethyl, hal is a member selected from the group consisting of chlorine and bromine, Me is a member selected from the group consisting of copper and nickel, and $n$ is a positive whole number of at most 2.

2. The copper-containing reactive dyestuff of the formula

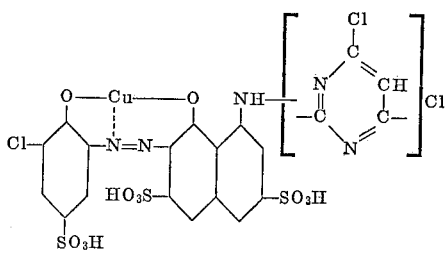

3. The copper-containing reactive dyestuff of the formula

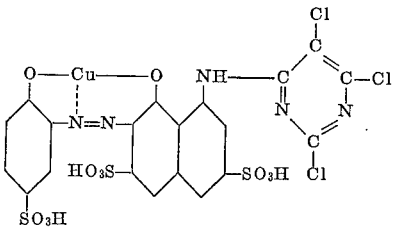

4. The nickel-containing reactive dyestuff of the formula

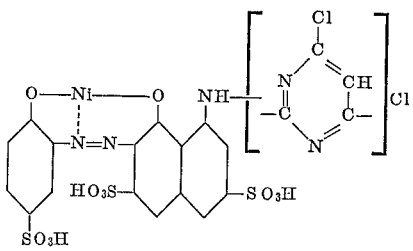

5. The copper-containing reactive dyestuff of the formula

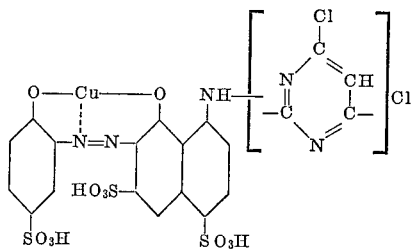

6. The nickel-containing reactive dyestuff of the formula

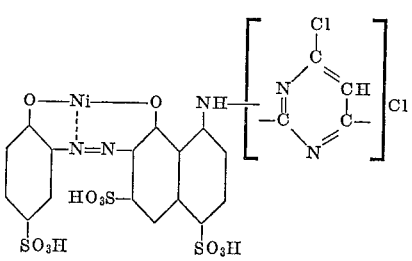

7. The nickel-containing reactive dyestuff of the formula
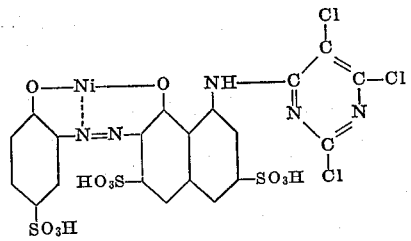
References Cited by the Examiner
UNITED STATES PATENTS
3,007,762  11/61  Wegmann et al. ____ 260—151 X
FOREIGN PATENTS
1,220,770  1/60  France.
1,221,621  1/60  France.
1,225,281  2/60  France.
CHARLES B. PARKER, *Primary Examiner.*